United States Patent [19]

Kateman et al.

[11] Patent Number: 5,603,257
[45] Date of Patent: *Feb. 18, 1997

[54] APPARATUS FOR PRODUCING AND DISPENSING AERATED OR BLENDED FLUID PRODUCTS

[75] Inventors: Paul Kateman, Cambridge; Matthew K. Haggerty, Milton; Clay A. Burns, Medford, all of Mass.

[73] Assignee: Turbo Dynamix Limited Partnership, Cambridge, Mass.

[ * ] Notice: The term of this patent shall not extend beyond the expiration date of Pat. No. 5,292,030.

[21] Appl. No.: 308,665

[22] Filed: Sep. 19, 1994

Related U.S. Application Data

[60] Division of Ser. No. 154,747, Nov. 18, 1993, Pat. No. 5,433,967, which is a continuation-in-part of Ser. No. 740,725, Aug. 6, 1991, Pat. No. 5,292,030, which is a continuation-in-part of Ser. No. 564,719, Aug. 6, 1990, abandoned.

[51] Int. Cl.$^6$ .................. A23C 3/04; F25C 1/18
[52] U.S. Cl. .................. 99/455; 99/323.2; 62/69; 62/306
[58] Field of Search .......... 99/455, 452, 323.1, 99/323.2; 62/69, 306, 347; 306/3, 5, 4, 11, 101; 261/140.1, 18.1

[56] References Cited

U.S. PATENT DOCUMENTS

| | | |
|---|---|---|
| 1,094,082 | 4/1914 | McCaddon . |
| 1,978,928 | 10/1934 | Blum . |
| 2,415,585 | 2/1947 | Genova . |
| 2,761,516 | 9/1956 | Vassilkovsky . |
| 3,068,105 | 12/1962 | Morrison . |
| 3,117,629 | 1/1964 | Rotvand . |
| 3,337,195 | 8/1967 | Farison . |
| 3,340,825 | 9/1967 | Bombardieri . |
| 3,361,412 | 1/1968 | Cole, III . |
| 3,393,745 | 7/1968 | Durstewitz . |
| 3,503,757 | 3/1970 | Rubenstein . |
| 3,713,841 | 1/1973 | MacManus . |
| 3,765,318 | 10/1973 | Mazza . |
| 3,829,242 | 8/1974 | Duke et al. . |
| 3,958,428 | 5/1976 | Kelson . |
| 4,046,358 | 9/1977 | Grimes . |
| 4,058,296 | 11/1977 | Wetherby . |
| 4,140,736 | 2/1979 | Nielsen et al. . |
| 4,271,099 | 6/1981 | Kukla . |
| 4,673,006 | 6/1987 | Speck . |
| 4,704,873 | 11/1987 | Imaike et al. ................. 62/64 |
| 4,753,081 | 6/1988 | Koeneman et al. ........... 62/69 |
| 4,793,151 | 12/1988 | Masel et al. . |
| 5,024,066 | 6/1991 | Goavec ........................ 62/306 |
| 5,030,465 | 7/1991 | Curry et al. . |
| 5,041,246 | 8/1991 | Garrison . |
| 5,151,288 | 9/1992 | Curry et al. . |
| 5,292,030 | 3/1994 | Kateman et al. ............. 62/74 |
| 5,410,888 | 5/1995 | Kaiser et al. . |

*Primary Examiner*—David Scherbel
*Assistant Examiner*—Reginald L. Alexander
*Attorney, Agent, or Firm*—Cesari and McKenna

[57] ABSTRACT

Apparatus for producing and dispensing an aerated product comprises a mixer which has a first inlet for receiving a fluid, a second inlet for receiving a gas, and an outlet. A relatively long continuous turbulence passage of relatively small cross section has one end positioned to receive the effluent from the mixer outlet and its other end spaced from the mixer outlet so that the effluent is subjected to confined turbulent mixing in the turbulence passage until the fluid product is discharged from the passage other end. If that product is to be cooled, the turbulence passage leads to a cooling area which cools and at least partially freezes the fluid product issuing from that passage. The invention has particular application to the making and dispensing of frozen yogurt and ice cream and allows for the service of individualized fresh portions in a variety of flavors and with little required cleaning.

17 Claims, 5 Drawing Sheets

APPARATUS FOR PRODUCING AND DISPENSING AERATED OR BLENDED FLUID PRODUCTS

RELATED APPLICATION

This application is a division of Ser. No. 08/154,747, filed Nov. 18, 1993, now U.S. Pat. No. 05,433,967, which is a continuation-in-part of Ser. No. 07/740,725, filed Aug. 6, 1991, now U.S. Pat. No. 5,292,030 which, is a continuation-in-part of application Ser. No. 564,719, filed Aug. 6, 1990, now abandoned.

The present invention relates generally to the production and dispensing of aerated or blended fluid products. It relates more particularly to a method and apparatus in which fluids such as two liquids or a liquid and air or other gas are mixed in selected proportions with the mixture, often cooled to a solid or semi-solid state, being dispensed as needed. While the invention may be used to produce a variety of products, it has particular application to the production and dispensing of frozen confections such as ice cream and frozen yogurt. Consequently, we will describe the invention primarily in this context. It should be understood, however, that the invention has application to the dispensing of non-frozen and non-aerated products generally and to the intimate mixing of fluids.

BACKGROUND OF THE INVENTION

Aerated frozen products generally require the mixing of selected liquid ingredients with a prescribed volume of air and freezing of the resultant mixture and dispensing of the finished product. The desirability of the finished product is often related directly to the manner and to the degree in which the air is metered and blended with the liquid ingredients of the mixture and the manner in which the blended mix is frozen. The prior art is replete with examples of apparatus for dispensing ice cream and other semifrozen dairy products such as soft ice cream and frozen yogurt.

Usually in such dispensers, the liquid mix containing, in the case of ice cream, ingredients such as cream, milk, condensed milk, syrup, etc. is delivered to a freezing chamber containing air or another non-toxic gas. In the freezing chamber, the mixture is slowly frozen and mechanically agitated by blades or the like to incorporate the air or gas in the mixture. This aeration is especially important and produces an increase in bulk corresponding to a decrease in the product specific gravity, thereby providing what is referred to in the ice cream industry as "over-run". The slow freezing and continuous agitation of results in the formation of ice crystals and particles of varying size which can detract from the palatability of the resultant product.

The chamber typically serves both as the means of freezing and as a reservoir from which individual servings are withdrawn. When the ice cream is partially frozen to the proper consistency, it is pumped or extruded from the freezing chamber to the dispenser outlet for delivery, on demand, to containers such as cups and cones. Examples of such apparatus are disclosed in U.S. Pat. Nos. 3,904,085; 3,954,126 and 4,201,588.

The prior apparatus do not necessarily achieve dose control of over-run, which is a prime factor affecting product palatability and profit in the manufacture of ice cream and similar products. If there is not enough aeration in the finished product, not only may the product be so dense as to be unpalatable, but also more liquid mix is required to make a given volume of the product, thereby lowering profit. On the other hand, if there is too much air in the finished product, the product may be considered too "fluffy" and of lower quality and value. Also, in many states there are regulations against providing excessive over-run in certain products to protect the consumer from being charged for a product that consists largely of air.

Conventional dispensers are usually dedicated to dispensing one or two flavors of product and, in some cases, a combination ("twist") of the two. For example, in an ice cream shop, there may be one machine with two separate freezing chambers for making and dispensing chocolate and vanilla ice cream, a second two-chamber machine for making and dispensing strawberry and banana ice cream, a third machine dedicated to making and dispensing coffee and frozen pudding flavors, and so on. The reason for this is that each chamber typically contains a volume of ice cream greater than is required for a single serving. In order to dispense a different flavor ice cream, that chamber must be emptied before the new flavor can be made in that chamber and appear at the outlet of the dispenser; additionally, the vat of preflavored mix from which the material being aerated and frozen is drawn must also be cleaned. While high volume ice cream shops and confectionery stores may have sales to justify the presence of several dispensing machines dispensing many different products, smaller sales outlets can usually only afford one or two such machines and are thus restricted in the number of flavors that they can offer to customers.

Further, because the product is typically formed in a quantity that is greater than that to be dispensed at any one serving, the excess product remains in the chamber after formation and until the next serving is required. The excess is thus subjected to further mechanical beating by any blades in the chamber, as well as to excess freezing which promotes crystallization. Because of the quantity of the premixed flavors, and the continuous freezing and beating of several quarts of the product, the freshness and palatability of the product may be adversely affected in stores with slow sales of the product.

Another disadvantage of the prior dispensers is that they have many interior surfaces and moving parts that are difficult and time-consuming to clean and to maintain. At the end of each day or at other intervals prescribed by local Health Department regulations, each dispenser must be purged of any remaining product, and its chamber walls, pumps, and other internal parts cleaned thoroughly to prevent growth of bacteria that could contaminate product being delivered by the dispenser. Not only is the cleaning operation expensive in terms of downtime, it is also costly in terms of product waste and is an unpleasant and difficult job to get employees to do properly.

There have been attempts to produce and dispense aerated frozen products on a continuous basis by atomization. In one example of this type of dispenser, disclosed in U.S. Pat. No. 2,594,422, a liquid mix and a liquid refrigerant are mixed in a mixing chamber and fed through a rotary emulsifier which forms a single liquid emulsion. The emulsion is then jetted from a spray nozzle, into a separating chamber where the liquid refrigerant evaporates, effectively freezing adjacent droplets of mix and thereby transforming them into flakes or a fine powder. Groups of flakes then agglomerate into larger particles containing an interior void. The refrigerant adsorbed on the interior surfaces of the void may further expand in the separating chamber to increase the bulk of the particles and thus decrease their density. The liquid refrigerant evaporated in the separating chamber is drawn off and reused. The frozen particles fall into the chamber of a screw-type extruder which compresses the particles at a controlled rate to give the final product the desired density and drives the frozen product to the dispenser outlet.

The over-run is formed by, and limited by, the void space between flakes formed by mechanical agglomeration as opposed to actual entrapment of air within the interior of an individual droplet. Thus, even though that patented dispenser uses atomization to make an aerated frozen product, the over-run is determined by the amount of liquid refrigerant adsorbed in the liquid mix before it is fed to the separator. In addition, the extruder is required to further reduce over-run and improve body texture.

Also that patented apparatus, like the other dispensers described above, has various internal surfaces and moving parts which must be cleaned in order to keep that dispenser in a sanitary condition. Moreover, there is always a supply of frozen product in the extruder chamber. As described above, this makes it impossible to change quickly from one product flavor to another and, if there is a change without disassembling and cleaning the machine, this results in a mixing of flavors.

SUMMARY OF THE INVENTION

Accordingly, it is an object of this invention to provide apparatus which uniformly mixes fluids to obtain a superior blended or aerated product.

Another object of the invention is to provide apparatus for producing and dispensing an aerated product which does not require the maintenance of a large volume of product within the apparatus.

A further object in the invention is to provide apparatus of this type which is simple in construction and is easy to make and maintain.

Still another object of the invention is to provide apparatus of this general type which facilitates changing substantially immediately from one product mix to another to satisfy the demands of individual customers.

A further object of the invention is to provide apparatus for producing and dispensing individualized, small portions of freshly aerated frozen products on demand.

Yet another object is to provide apparatus for producing and dispensing aerated frozen products which is easy to clean and to maintain in a sanitary condition.

Another object of the invention is to provide apparatus for making ice cream and the like of high quality and whose over-run is closely controllable over a wide range.

A further object of the invention is to provide apparatus of this general type which occupies a relatively small amount of space while dispensing multiple flavors.

Still another object of the invention is to provide apparatus for intimately dispersing a fluid in a liquid.

Yet another object of the invention is to provide a method of producing and dispensing an aerated product which enables close and consistent control over the amount of gas entrained in the final product.

Still another object is to provide a method of making ice cream, yogurt and similar aerated frozen products which enables close control of product over-run over a wide over-run range.

Other objects will, in part, be obvious and will, in part, appear hereinafter. The invention accordingly comprises the several steps and the relation of one or more of such steps with respect to each of the others, and the apparatus embodying the features of construction, combination of elements and arrangement of parts which are adapted to effect such steps, all as exemplified in the following detailed description, and the scope of the invention will be indicated in the claims.

Briefly, in accordance with this invention, aerated products such as ice cream, frozen yogurt, or the like are produced and dispensed by atomizing a fluid such as a liquid product mix and a fluid such as a gas and thereafter thoroughly mixing them to form a smooth, relatively homogeneous product whose composition is controllable over a wide range of mixtures. In one embodiment of the invention, the first fluid, e.g., yogurt, is atomized before it is mixed with the second. In another embodiment, the atomization occurs concurrent with the mixing. In particular, in the present invention, mixing is achieved by passing the mixture or its ingredients, under pressure, through an extended conduit under conditions such that turbulent mixing occurs. In particular, in the formation of an aerated product such as ice cream or frozen yogurt, the atomization process breaks up the liquid ice cream or yogurt mix into fine particles, while the confinement of the particles and air stream in the conduit creates turbulent mixing of those ingredients which causes the air to become very thoroughly admixed with the liquid mix particles. While the exact process is complex, we believe that the continuing, very close confinement of the particles as they are forced along the conduit and while still largely in the liquid state causes them to combine and coalesce to form larger liquid particles with the air entrapped and enclosed therein as though there were bubbles surrounded by a liquid "skin".

The amount of aeration in the product is a function of a number of factors, such as the length of the conduit, its inside diameter, the discharge velocity from the mixing space into the conduit, the mix particle size, the ratio of the gas to the mix, the volume flow rate, the mix density and viscosity, the mix surface tension, and the temperature of the mix. The liquid product mix advantageously comprises a neutral base of ice cream, yogurt or the like, together with one or more flavorings and other additives as desired. During transit through the turbulent mixing passage, the flavoring and other additives are thoroughly admixed with each other and with the air to form a smooth relatively homogeneous product of fine particles. Although the extent of mixing may be controlled by varying one or more of these factors, we have found that for the preferred embodiment described herein, the conduit length provides a convenient basis for control of the amount of aeration.

In one embodiment of the invention, the conduit is oriented vertically so that the aerated mix issuing from the conduit can drop through a cooling chamber directly into a suitable container positioned under the conduit. In another preferred embodiment, the aerated mix from the conduit is distributed onto the outer face of a chilled drum or wheel that is rotated at a selected speed. While on the drum, the mix freezes to form a coating on the drum. As the drum rotates, this coating is progressively scraped from the drum and drops into a container positioned under the drum.

Different additives can be introduced into the aerated product stream by injecting them into the liquid mix or gas stream or into the turbulent mixing passage, or can be dropped into the container as it is filled with the frozen mix. Thus, for example, if the first product portion being dispensed requires an additive A1, the proper amount of that additive is injected into, e.g., the conduit for mixing with the liquid mix and gas comprising that first portion. If the next portion requires an additive A2, that additive is injected into the mixing passage in lieu of additive A1, and so on.

The internal volumes of the mixing passage and the pipes injecting the additives into that mixing passage are quite small relative to the volume of the usual product portion being dispensed. Therefore, when changing additives, there is a negligible amount of carryover of the additive from one portion into the succeeding portion. Even that minimal amount of carryover or "contamination" can be substantially eliminated as will be described later.

The present apparatus and method thus enable the production of aerated products on an "as-needed" basis without having to maintain a supply of the finished product in the dispenser. Even in the case of an aerated frozen product such as ice cream, as soon as the product is produced, it is conducted directly into a container; substantially none of the product remains in the dispenser. Therefore, the same dispenser can dispense a variety of different ice cream flavors, for example, without there being any appreciable flavor carryover from one serving to the next. Also, in having minimal moving parts contacting the product and no product storage requirement, the dispenser can be maintained in a sanitary condition with minimum effort and downtime.

The present turbulent mixing technique can also be used to thoroughly blend other fluids such as two or more liquids, e.g., coffee and cream soda, water and flavoring syrups, different color paints, different creams, etc. or a liquid with fluid particulate material, e.g., milk and powdered chocolate, water and spackel powder, etc. or even two or more slurries. Therefore, the invention should find wide use in a variety of different applications inside and outside the food industry.

BRIEF DESCRIPTION OF THE DRAWINGS

For a fuller understanding of the nature and objects of the invention, reference should be made to the following detailed description of one preferred embodiment of the invention, taken in connection with the accompanying drawings, in which.

DETAILED DESCRIPTION OF ILLUSTRATIVE EMBODIMENTS

Figure 1:
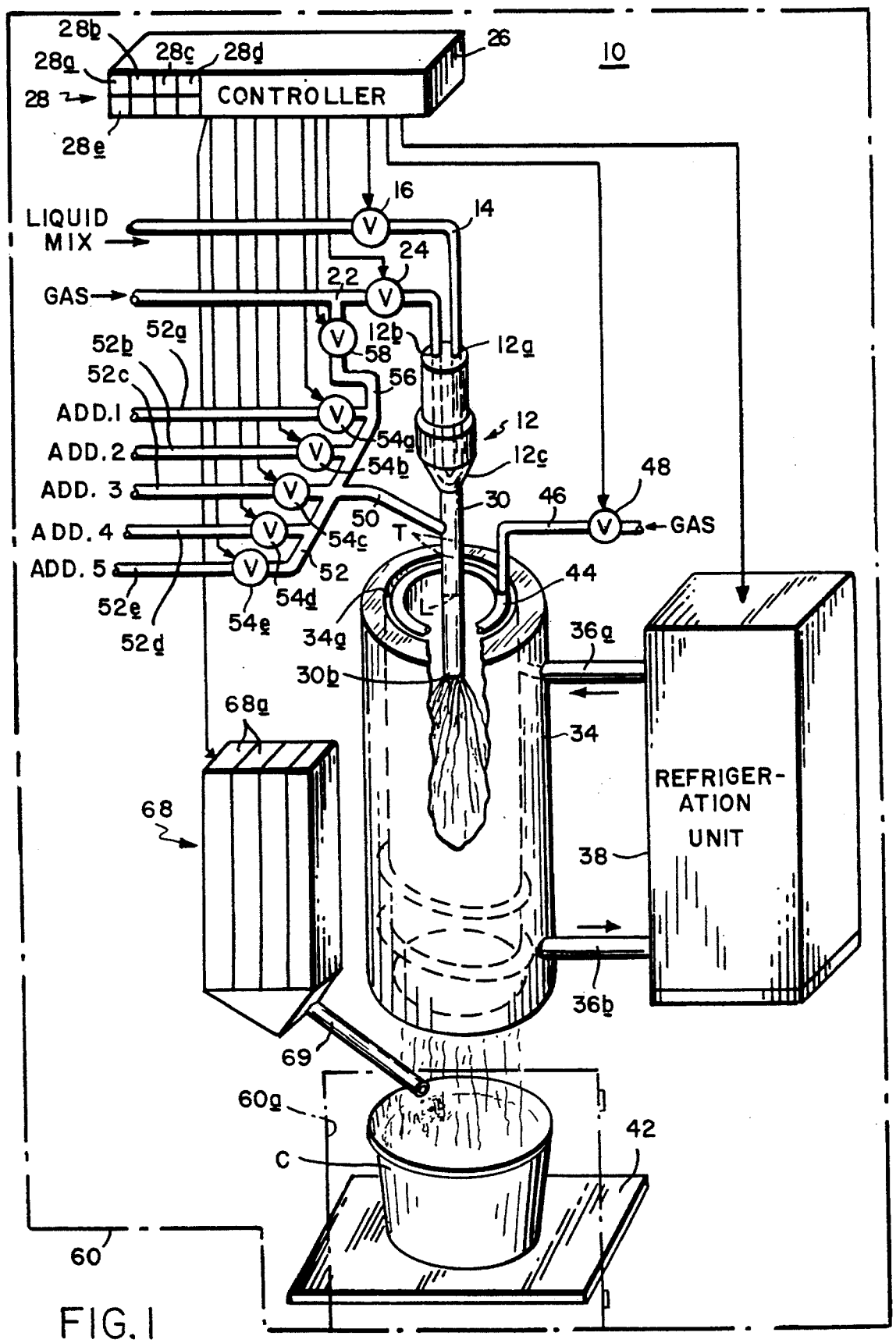
FIG. 1 is an isometric view, with parts broken away, showing apparatus for producing and dispensing an aerated frozen product according to this invention.

Referring to FIG. 1 of the drawings, apparatus in accordance with the present invention for producing and dispensing an aerated product, in this example, a frozen product such as ice cream, is indicated generally at 10. It comprises a mixing chamber defined, in this embodiment, by a vertically oriented air atomizing nozzle 12 having a first inlet 12a for liquid, a second inlet 12b for air or other gas, and a single discharge outlet 12c. Connected to the inlet 12a is a conduit or tube 14 which leads from a source (not shown) of the liquid to be aerated. In this example, that liquid is a more or less standard mix of the ingredients for making a frozen food product such as ice cream. The flow of fluid through pipe 14 to nozzle 12 is controlled by a solenoid-actuated valve 16 in line with pipe 14.

The gas for aerating the liquid mix is supplied to nozzle 14 by a pipe 22 leading from a gas source (not shown) which delivers the gas at a pressure above atmospheric. In experimental apparatus demonstrating the invention, pressures of from 5 to over 100 psi have been used. The gas may be air or any other non-toxic gas customarily used to provide over-run or bulk in conventional ice cream products. The flow of gas to nozzle 12 is controlled by a solenoid-actuated valve 24 in line with pipe 22. The operations of valves 16 and 24 are controlled by output signals from a controller 26 which has an accessible key pad 28 by which an operator can control the operation of apparatus 10.

The atomized mix issuing from the mixing chamber, i.e. from nozzle outlet 12c, is not sprayed into an open space as usually happens with industrial nozzles of this type. Rather, it is directed into one end of a relatively long, e.g. 2 to 24 in., relatively small diameter, e.g. 0.08 to 0.24 in. turbulent mixing passage in the form of a conduit 30 wherein the effluent from nozzle 12 is subjected to considerable turbulence and buffeting because of passage through the conduit. Thus, in the conduit, there is violent turbulent mixing of the atomized mist particles and the gas, as shown at T in FIG. 1, which apparently causes the particles to coalesce forming somewhat larger particles while, at the same time, entrapping the gas so that the gas is effectively contained within the particles. Consequently, the fluid issuing from the discharge end 30b of conduit 30 is comprised of approximately uniformly sized, still relatively small aerated particles with the air enclosed within an outer generally continuous "skin" formed by the mix. As explained in more detail below, the dimensions of the conduit used for the specific application are dependent on a number of factors, including the specific product mix, the desired production rate, the driving pressure, atomizing nozzle size, desired aeration, and desired "wetness", among other factors. In general, the length of the conduit will be at least several times the diameter of the conduit (or equivalent diameter, that is, the diameter of a conduit of cross section equal to that of a given circular cross section).

During passage through the cooling chamber, the particles are "flash" frozen in a few, i.e. 1 to 10, seconds due to the relatively high ratio of surface area to volume of the particles emerging from the conduit. The small particles emerging from the conduit, combined with the flash freezing of each particle, produce a very uniform, smooth and idealized product in terms of what is normally strived for in palatability. Further, it is calculated that the energy requirements of the process lie within the range of conventional freezing machines.

Referring again to FIG. 1, positioned below the turbulence conduit 30 is a vertically oriented tubular cooling chamber 34 which has a central passage 34a for receiving the discharge end 30b of conduit 30, the chamber extending an appreciable distance below the conduit. Formed in the wall of chamber 34 is a helical passage 36 for circulating refrigerant through the chamber. The upper and lower ends of the passage 36 are connected by pipes 36a and 36b to the outlet and inlet, respectively, of a refrigeration unit 38. Unit 38 may also be controlled by controller 26.

Spaced below the lower end of chamber 34 is a horizontal shelf or tray 42 for supporting a container such as a paper or plastic cup C. Cup C is normally positioned directly below the central passage 34a in chamber 34 so that it is in position to catch or receive ice cream dropping under the influence of gravity from the lower end of the chamber passage 34a.

Preferably, the diameter of chamber passage 34a is made sufficiently large that the aerated mix particles issuing from the conduit end 30a do not contact and coat the wall of that passage. This minimizes the need to clean that surface. The buildup of particles on that interior wall can be further avoided by providing an air barrier or boundary layer adjacent to the passage wall. To provide such an air boundary layer, apparatus 10 includes, at the top of chamber passage 34a, a circular pipe 44 having a multiplicity of small holes (not shown) in its underside. Pipe 44 is connected to a gas source (not shown) by way of a pipe 46 having an in-line solenoid-actuated valve 48 controlled by controller 26. When valve 48 is opened, e.g. just before each dispensing cycle, a downwardly directed cylindrical layer of air helps isolate the wall of passage 34a from the fluid issuing from conduit 30.

As an alternative means of providing the air barrier, chamber 34 may be composed of spaced-apart inner and outer walls, with the former wall being porous, and pipe 46 delivering gas to the space between the walls. The gas issuing through the porous inner wall will tend to repel any mix particles approaching that wall.

In accordance with this invention, apparatus 10 includes provision for allowing selection of the flavors of the ice cream to be dispensed by apparatus 10. This is accomplished by means of a tube 50 which communicates with a manifold 52 having several, herein five, inlet branches 52a to 52e. Each of these branches is connected to a source (not shown) of an additive, e.g. chocolate, strawberry, vanilla, etc., syrup. Solenoid-actuated valves 54a to 54e are included in the branches 52a to 52e to enable selection of the additive or additives to be supplied to manifold 52. All of these valves are controlled by signals from controller 26. The tube 50 connects to an upper end segment of conduit 30 to supply the selected additive or additives to the fluid in conduit 30, although, alternatively, the connection may be made upstream from conduit 30.

The components of apparatus 10 may be housed in a housing shown in phantom at 60 in FIG. 1, an appropriate opening 60a being provided in a wall of housing 60 to provide access to the shelf 42 so that a cup C can be positioned on the shelf as shown in FIG. 1.

Key pad 28 has selection keys or buttons 28a to 28e corresponding to the valves 54a to 54e to enable the operator to select the flavor of the ice cream product to be dispensed by apparatus 10. Controller 26 is programmed so that when the operator presses, say, key 28a, the controller 26 applies timed actuating signals to valves 16 and 24, thereby opening those valves so that non-flavored liquid ice cream mix and gas are fed to nozzle 12 in the proper ratio. As nozzle 12 sprays these fluids into conduit 30, controller 26 sends a signal to valve 54a opening that valve so that additive 1, e.g. chocolate syrup, is injected by way of manifold 52 into conduit 30, so that the additive is entrained in the effluent from nozzle 12 and thoroughly mixed into the liquid mix being aerated in the conduit 30. The signals from controller 26 that control valves 16, 24 and 54a cause those valves to remain open for the time required for the apparatus 10 to dispense a selected volume of ice cream product, e.g. one portion or serving of chocolate ice cream, that will fill the cup C on shelf 42. Then valves 16, 24 and 54a close so that substantially no additional fluid flows from the conduit 30.

The illustrated apparatus also allows for addition of liquid or solid materials to the frozen product in container C. For this, a plural compartment dispenser 68 is provided adjacent to chamber 34. The dispenser has several compartments 68a which may contain various materials such as chopped nuts, jimmies, chocolate syrup, etc. In response to actuation of the appropriate key of key pad 28, controller 26 causes the dispenser to dispense the selected material through a common outlet tube 69 whose discharge end overlies container C. The material will be incorporated into, or added to the top of, the product in container C depending upon when the dispensing is commenced and ended.

As soon as the cup C has been filled, it can be removed and replaced by an empty cup. The operator can then fulfill the request of the next customer. If that next customer wishes a different flavor ice cream, e.g. vanilla, the operator can depress the key pad key corresponding to that flavor, e.g. key 28c. In response, controller 26, in addition to opening valves 16 and 24 as before, will open valve 54c so that vanilla flavoring will be fed to conduit 30 and entrained in the non-flavored ice cream mix issuing from nozzle 12.

The controller 26 may also be programmed so that the dispenser will dispense different size portions. Thus by depressing a certain key of the key pad, the operator may fill a pint-size container with the selected flavor ice cream. Depression of another key may dispense a half pint of the product, and so on.

The internal volume of conduit 30 is very small, e.g. a small fraction of a cubic inch, so that any column of flavored product left standing in that tube after each dispensing operation, is insufficient to materially affect the flavor of the next full product portion being dispensed by apparatus 10. Further, by maintaining valve 24 open for a brief interval after stopping the flow of mix by closing valve 16, the conduit can effectively be purged of remnant mix.

It should be noted that after each dispensing operation, branch tube 50 and manifold 52 remain filled with liquid flavoring or syrup from the previous cycle. The amount of same can be minimized by minimizing the standing volumes between valves 54a to 54e and conduit 30, i.e. the lengths and internal diameters of tube 50 and manifold 52 so that the amount of syrup that is carried over from one portion to the next is such a small percentage of the total volume of each portion that there is no discernible flavor carryover, i.e. color or taste, from one portion to the next.

However, apparatus 10 includes provision for avoiding even that minimal additive carryover. More particularly, a conduit 56, having an in-line solenoid actuated valve 58, is connected between pipe 22 upstream from valve 24, and the end of manifold 52. At the end of each dispensing cycle, controller 26 issues a signal to valve 58 which opens that valve for a sufficient time to purge manifold 22, tube 50 and conduit 30 of their liquid contents.

Still referring to FIG. 1, it is important to appreciate that apparatus 10 has no moving parts such as emulsifiers, extruders, etc. that could break and require service. Furthermore, there are very few surfaces that have to be cleaned to maintain the machine in a clean and sanitary condition. The nozzle 12 and conduit 30 have very small internal volumes and these components can be cleaned by flushing the nozzle and tube with gas supplied through pipe 22. Similarly, tube 50 and manifold 52 can be purged of residual additive by flushing them with gas supplied by pipes 22 and 56. Preferably, for this purpose, the key pad 28 includes a key which the operator can actuate at the end of the day or at other appropriate times which will cause controller 26 to open valves 24 and 58 without opening the other valves so that gas under pressure scrubs the internal surfaces of those parts.

Additionally, if desired, pipe 14 may be provided with a branch downstream from valve 16 and leading from a source of hot steam or other sanitizing fluids (not shown) so that by depressing an appropriate key of the key pad 28, the operator can cause controller 26 to open a valve in that branch so that steam or other sanitizing fluid will flow through nozzle 12, conduit 30 and chamber passage 34a to sanitize their surfaces. The only parts of apparatus 10 that may require manual cleaning from time to time are the surface of chamber passage 34a and the surfaces of shelf 42.

When making an aerated frozen product such as ice cream or frozen yogurt, it is very important to be able to control the over-run because this directly affects the cost and palatability of the product as discussed at the outset. Apparatus 10 will readily produce product with over-runs ranging from about 5% to 80% or higher. Thus, for example, it can make gourmet ice cream which has a preferred over-run of 5–25%, soft ice cream with a preferred over-run of about 30–50%, and ice milk or other products whose over-run should be about 50–80% or higher. Furthermore, for each product, the over-run can be controlled closely to maximize profit while maintaining product quality and palatability.

The flow rates of the gas and liquid mix supplied to nozzle 12, and the length and temperature of cooling chamber 34, e.g. 6 to 10 in. and −40° to 0° F., respectively, for example, are strongly interdependent as regards the number and size of aerated particles that freeze in chamber 34 before falling into container C. However, these factors primarily influence product wetness/dryness which has more to do with product quality than with over-run. For example, increased air pressure increases over-run slightly. But it also increases particle velocity and thus reduces the percentage of the particles that freeze in chamber 34 so that a more moist product is dispensed. On the other hand, an increased block temperature results in a wetter product with less over-run. In both cases, the resultant product is wetter and, therefore, compromised in quality.

However, the length of the turbulent mixing passage or conduit 30, by itself, has been found to have a strong influence on the amount of over-run in the product being dispensed. As the length of that conduit is increased up to some maximum, there is an increase in the efficiency of gas entrapment in the liquid mix particles flowing through the conduit. Consequently, more gas is incorporated in the mix particles issuing from the conduit, resulting in a frozen product with greater over-run.

Figure 2:
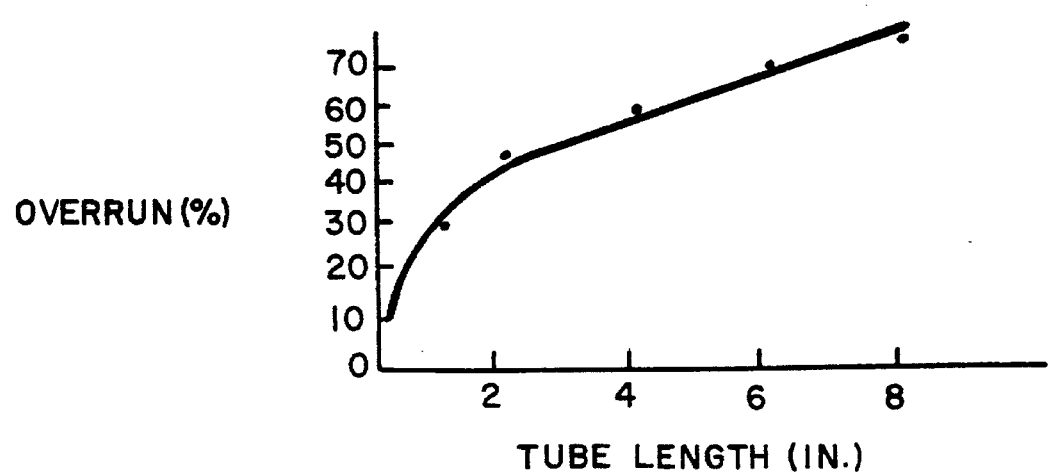
FIGS. 2 and 3 are diagrammatic views that help to explain certain aspects of the FIG. 1 apparatus.

FIG. 2 is a graph showing, in the case of one particular example, the variation in the over-run with conduit length when the mix particles from the conduit were passed through the conduit at a constant flow rate. As seen from FIG. 2, in that example there was a smooth and substantial increase in over-run as the conduit length was increased. The curve indicates that adjustment of the length of the turbulence conduit caused a variation in the product over-run from about 5% to over 80%. In apparatus 10, the length of conduit 30 may be adjusted by changing conduits, or more conveniently, by making the conduit extensible, i.e. as two telescoping sections, as indicated by the dashed line L across conduit 30 in FIG. 1.

Figure 3:
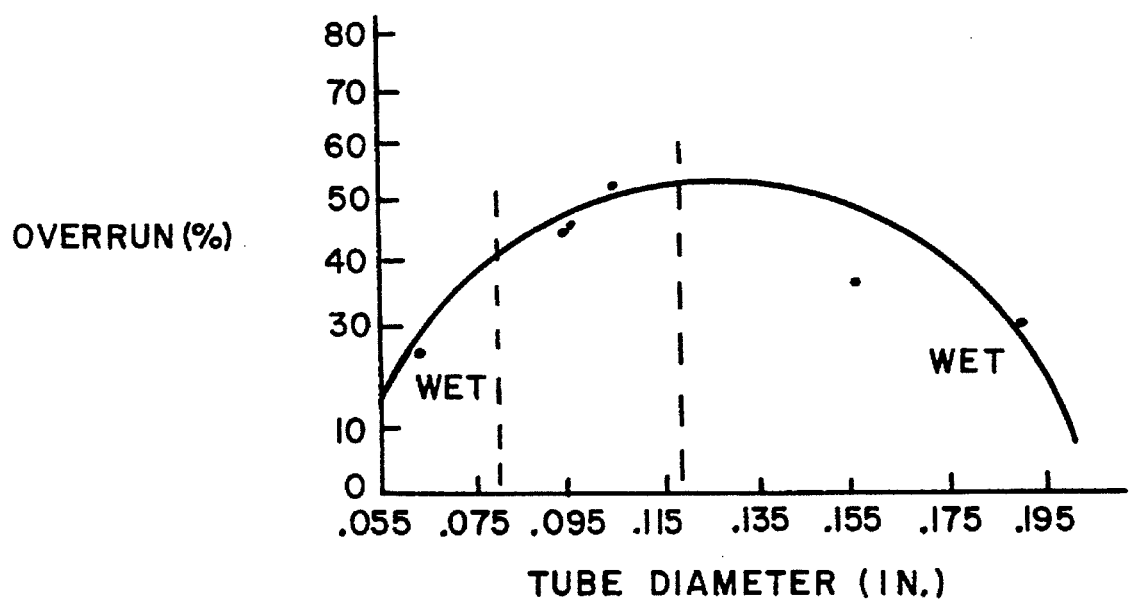

The inside diameter of conduit 30, on the other hand, is not a variable especially suitable for over-run control. This is shown by FIG. 3 which is a graph plotting over-run verses conduit diameter in this one example. The curve there shows that with that particular production flow rate, there is only a small range of conduit diameters, i.e. 0.08 to 0.12 in., at which good quality product is produced. Outside that range, the product is too moist and has too little body.

Figure 4:
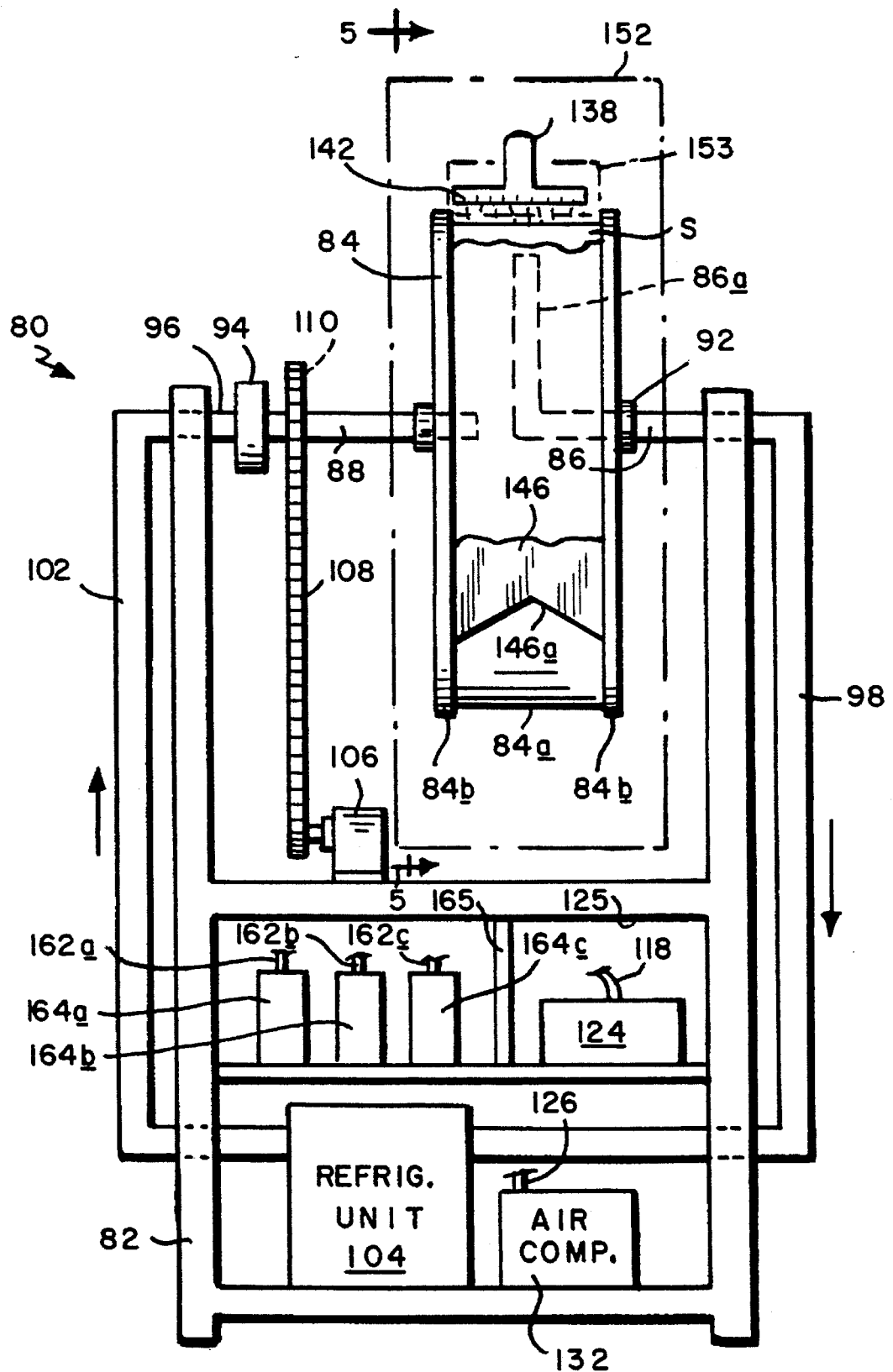
FIG. 4 is a side elevational view showing another, preferred, embodiment of the invention.
Figure 5:
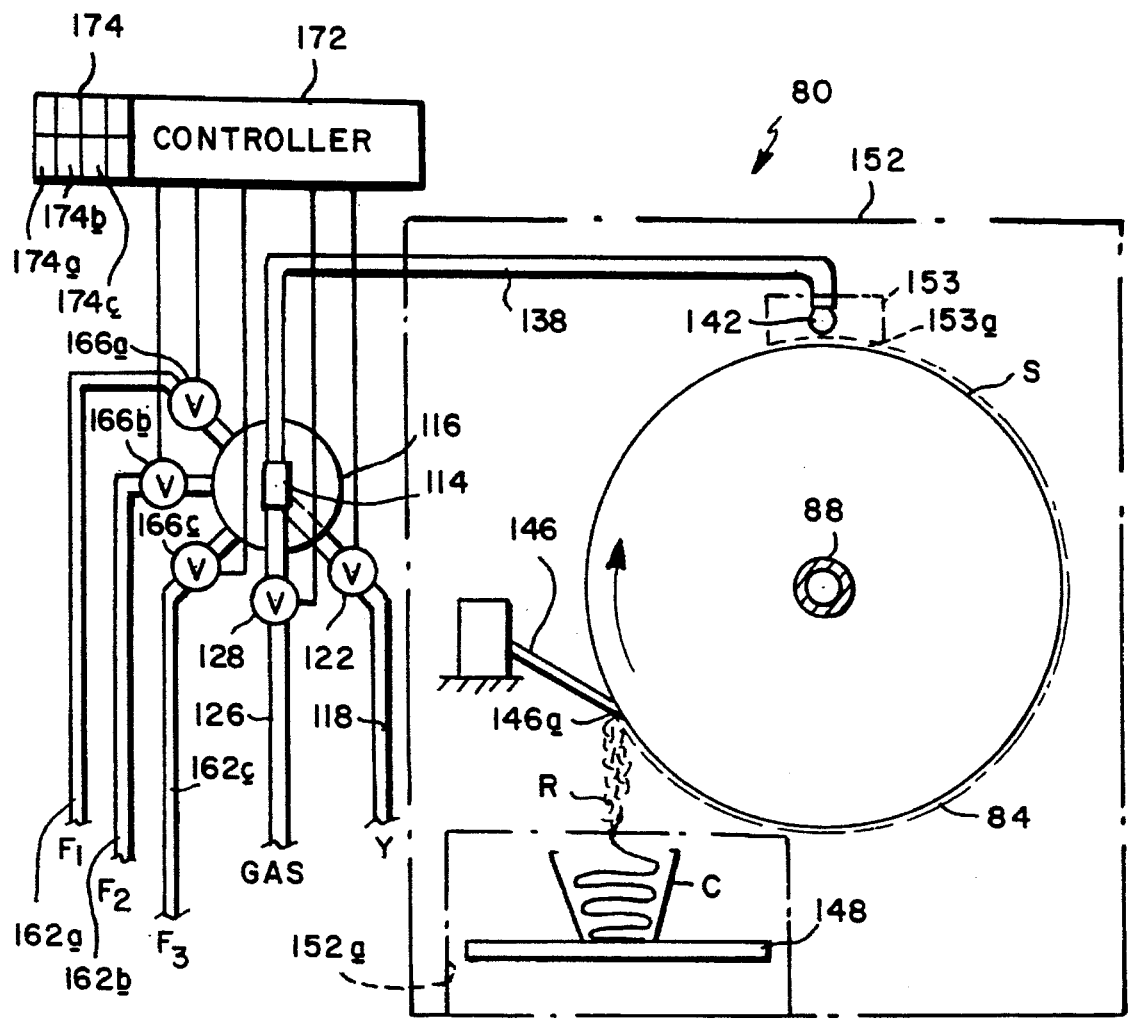
FIG. 5 is a sectional view taken along line 5—5 of FIG. 4.

Refer now to FIGS. 4 and 5 which illustrate another embodiment of my invention shown generally at 80. Here, the product mix and gas are atomized in a plural port fitting rather than in a nozzle prior to being introduced into the turbulence conduit. Also, the effluent from the turbulence conduit, instead of dropping through a cooling chamber into a container, is deposited onto the outer surface or face of a rotary chilling drum. The frozen product is then scraped from the drum and deposited in a container.

Apparatus 80 comprises an upstanding support 82 which supports at its upper end a hollow fluid-tight rotary drum 84 which may be in the order of 2 feet in diameter and 4 inches wide. For ease of illustration, we have shown drum 84 supported on both sides by a pair of tubular axles 86 and 88 which project from opposite sides of the drum at the drum axis. One end segment of axle 86 is mounted to the support; the opposite end of that axle is connected to the drum by way of a rotary union or joint 92. Also, as shown in FIG. 4, axle 86 has a tubular extension 86a inside drum 84 which is bent up so that the extension extends almost to the top of the drum.

The tubular axle 88 has one end which is mounted to the left side of the drum, that end also projecting slightly into the interior of the drum. The opposite end of axle 88 connects to one side of a rotary joint or union 94, the opposite side of which is connected to a tubular shaft or axle 96 mounted to support 82. The outer ends of axles 86 and 96 are connected to pipes 98 and 102, respectively. These pipes extend down to the input and output, respectively, of a refrigeration unit 104 present at the bottom of support 82. When unit 104 is in operation, refrigerant is circulated up through pipe 102 through rotary joint 94 and axle 88 into drum 84. The refrigerant fills the drum up to the level of the upper end of the extension 86a inside the drum and drains through that extension and through axle 86 down through pipe 98 back to the refrigeration unit 104.

In practice, drum 84 may be supported from the back side only by way of a coaxial tubular axle instead of axle 88 so that refrigerant is supplied to and drained from the drum through the back of the drum. This makes it much easier to clean the drum.

At least the cylindrical surface 84a of drum 84 is made of a highly thermally conductive material such as stainless steel or nickel-plated aluminum so that the liquid refrigerant maintains that surface at a temperature well below freezing, e.g. −20° F. to −25° F.

The discoid sides of drum 84 may be made of the same material as the drum surface 84a. Preferably, however, they are made of a rigid, thermally insulating material such as a low temperature-resistant plastic material to minimize the energy required to cool the drum. Preferably also, the sides of the drum have a slightly larger diameter than the surface 84a to provide circumferential flanges 84b at opposite sides of the drum for reasons that will become apparent later.

Drum 84 is rotated by an electric motor 106 mounted to support 82. The shaft of motor 106 drives a timing chain or belt 108 which is trained around a pinion 110 rotatively fixed to axle 88. When motor 106 is in operation, it rotates drum 84 at a selected speed, e.g. 5 to 40 rpm, in the clockwise direction as viewed in FIG. 5.

Figures 6, 7:
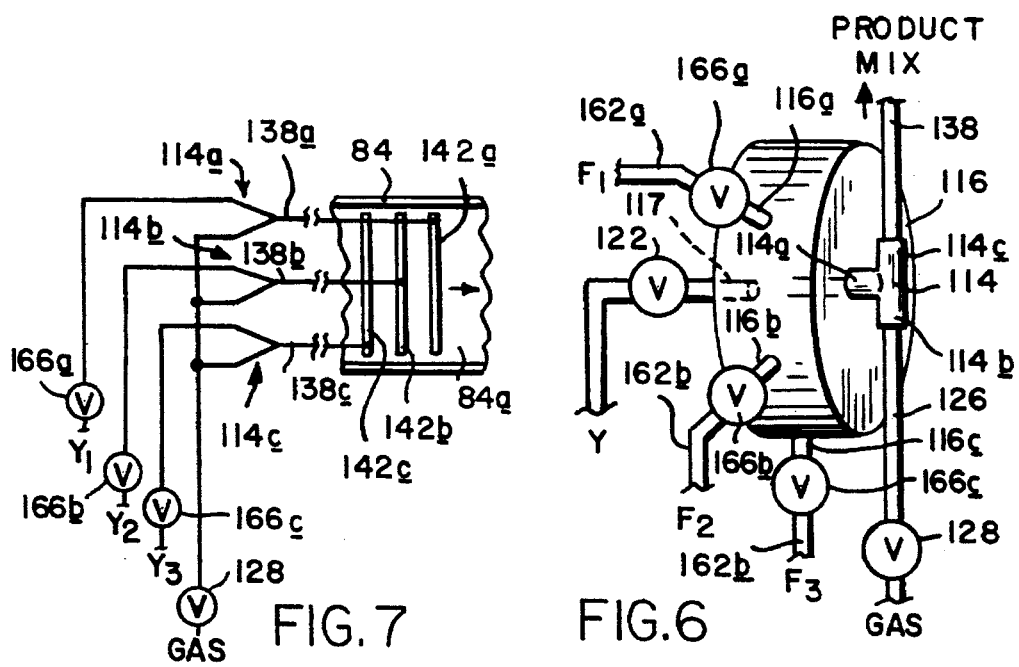
FIG. 6 is a fragmentary isometric view showing a portion of the FIGS. 4 and 5 apparatus in greater detail.
FIG. 7 is a schematic diagram showing another apparatus embodiment.

Referring now to FIGS. 5 and 6, in apparatus 80, the product mix is atomized by air or other gas in a plural-port fitting 114. In the illustrated apparatus, the fitting is a T-fitting; but is could be a Y-fitting or have some other plural port configuration. In any event, fitting 114 receives product mix, e.g., yogurt mix (Y), through its leg 114a which is connected to the outlet of a cylindrical manifold 116 which will be described in detail shortly. Suffice it to say at this point, the manifold has an axial passage 117, the outlet end of which is connected to fitting leg 114a. Coupled to the inlet end of passage 117 is a pipe 118 containing an in-line valve 122 and which leads down to a pressurized container 124 supported by support 82 as shown in FIG. 4. Container 124 is of a type well known in the food industry. It is basically a flexible bag for containing a liquid such as a yogurt mix. The bag is mounted inside a housing 125 which may be pressurized to collapse the bag and force the liquid out through pipe 118 at a selected pressure, e.g., 70 psi in the case of apparatus 80.

Fitting 114 receives air or other gas at one of its arms 114b. For this, that arm is connected to a pipe 126 containing an in-line electric valve 128, the pipe leading down to an air compressor 132 supported on support 82 next to the refrigeration unit 104 as shown in FIG. 4. Compressor 132 delivers the gas at a suitable pressure, e.g. 50 psi.

The remaining arm 114c of fitting 114 is connected to one end of a turbulent mixing passage or conduit 138 whose opposite end is disposed over drum 84. Most preferably, that end of the turbulence conduit connects to a fluid distributor 142 which is basically a short pipe with holes in it and which is spaced just above the drum surface 84a parallel to the drum axis. The function of the distributor 142 is to distribute aerated product mix issuing from conduit 138 relatively uniformly on the drum surface 84a between flanges 84b when the drum is rotated. An enclosure 153 surrounding the distributor confines the discharge from the distributor. The bottom edge of the enclosure is spaced slightly above the face of the drum (see FIG. 5), e.g. by 0.050" to thereby provide a narrow passage 153a through which the product discharges to form a thin layer on the drum.

Thus, just as described above in connection with the FIG. 1 apparatus, the atomized mix in the mixing chamber defined by fitting 114 is directed into turbulence conduit 138 where the fluids are subjected to considerable turbulence and buffeting because of passage through that conduit. This encourages the formation of an agglomeration of product mix particles and flavoring and other additives while, at the same time, entrapping the air or the gas so that the gas is effectively contained within the particles. Consequently, the fluid issuing from the distributor 142 is comprised of approximately uniformly sized, still relatively small aerated particles with the air enclosed within an outer generally continuous "skin", all as described above in connection with FIG. 1. Also as described there, the conduit is dimensioned so that the fluid leaves the conduit at very low or nearly atmospheric pressure so that there is minimum splatter. To help in this respect, the conduit 138 may be provided with a bore that is tapered so as to become wider at its discharge end.

As noted earlier, the amount of aeration is a function of a number of factors, including particularly the density and viscosity of the mix, the length and inner diameter of the turbulence passage, and the velocity of flow of the mix through the turbulent mixing passage. The latter is, in turn, strongly dependent on the driving pressure applied to the mix. In the present case, for standard Elgin non-fat natural base yogurt mixes and standard flavor syrups and a production rate of 0.8 oz./sec. using a mix driving pressure on the order of 70 psi and air pressure of about 50 psi, we have found that optimum aeration (40%) is attained with a conduit length-to-diameter ratio on the order of 100 to 200, e.g., 0.17 in. ID by 24 in. long. Lengths less than this, of course, can be used to provide aeration percentages less than the maximum obtainable for a given mix and driving pressure, while lengths greater than this can be used to first mix and aerate the product and then convey it to the desired location. The excess length, of course, will add nothing to the mixing, but will also not detract unduly from the product provided that it is not excessively long.

The discharge from distributor 142 is deposited onto drum 84 where it spreads out over the drum surface 84a forming a uniform coating thereon as the drum rotates. Since the surface 84a of the drum is maintained at a low temperature because of the refrigerant circulated through the drum, that coating freezes immediately, forming on the drum surface a "skin" S of the frozen product, e.g. ice cream or yogurt.

As best seen in FIGS. 4 and 5, a doctor blade 146 is spaced angularly around the drum from distributor 142 and adjacent to the drum 84a so that its edge 146a engages the drum surface 84a. Thus, the doctor blade is able to scrape the frozen product skin S from the surface of the drum whereupon the product may drop as a ribbon R into a container C placed on a shelf 148 under the drum as shown in FIG. 5. Preferably, the blade edge 146a is formed with a V-shaped notch so that the edge "corrals" the edge margins of the skin and directs them toward the middle of the blade so that the frozen product can drop into a container C having a relatively small mouth, e.g., a standard ice cream container or cone.

Apparatus 80 is provided with a housing shown in phantom at 152 (FIG. 5) which encloses drum 84, distributor 142 and doctor blade 146, an appropriate opening 152a being provided in a wall of housing 152 to provide access to shelf 148 so that a cup C can be positioned on the shelf under the drum, as shown in FIG. 5.

In accordance with the invention, apparatus 80 also includes provision for selecting flavors of the yogurt or other product being dispensed by the apparatus. The injection of the flavors occurs at manifold 116.

More particularly, the manifold is a conventional device which has, in addition to the axial passage 117, a circumferential array of radial injection ports. For purposes of illustration, the manifold is shown as having only three such ports, 116a, 116b and 116c for injecting three different flavorings $F_1$, $F_2$ and $F_3$ into the yogurt mix Y. Each such port extends to the axial passage 117, so that the flavoring injected through that port is entrained in the fluid stream flowing through passage 117. Also, each port is provided with a check valve (not shown) to prevent backflow through that port.

Tubes or pipes 162a, 162b and 162c connect ports 116a, 116b and 116c, respectively, to pressurized syrup containers 164a, 164b and 164c, respectively, in a compartment 165 supported by support 82 next to the yogurt container 124. These containers may be similar to container 124. The tubes include in-line electrically operated valves 166a, 166b and 166c, respectively, which control the flow of fluid from the containers 164a, 164b and 164c to the corresponding injection ports of manifold 116. The operation of these valves, as well as of valves 122 and 128 controlling the flow of yogurt and air to the T-fitting 114, are controlled by output signals from a controller 172 which has an accessible keypad 174a by which an operator can control the operation of apparatus 80. Controller 172 may also control the status of refrigeration unit 104, air compressor 132 and the speed of the drum drive motor 106. The containers 164 may be individually pressurized, or they may be pressurized via compartment 165 which itself may be pressurized from an external source; the same is true for container 124. Advantageously, the compressor 132 supplies the requisite pressure for all the containers, as well as the mixing air to pipe 126.

Keypad 174 has selection keys or buttons 174a to 174c to enable the operator to select among three flavors of the ice cream or yogurt product to be dispensed by the apparatus 80. Controller 172 is programmed so that when the operator presses one of the keys, e.g. key 174a, the controller 172 applies timed actuating signals to valves 122 and 166a thereby opening the valves. Resultantly, non-flavored yogurt mix flows through the manifold passage 117 and an additive, e.g. vanilla syrup, is injected by way of injection port 116a into passage 117 so that that additive is entrained in the mix flowing through that passage to the T-fitting 114. The controller also applies a signal to open the valve 128 so that compressed gas is introduced into the T-fitting 114, thereby producing a violent agitating and mixing action in the T-fitting 114 which atomizes and aerates the product mix flowing from that fitting to the turbulence conduit 138. The signals from controller 172 that control valves 122, 128 and 166a cause those valves to remain open for the time required for the apparatus 80 to dispense onto the rotating drum 84 a selected volume of aerated yogurt mix, e.g. one portion or serving of chocolate yogurt, that will fill the cup C on shelf 148. Then those valves close so that substantially no additional fluid flows through the conduit 138.

As soon as the product mix is dispensed onto drum 84, it freezes and forms a thin skin thereon. The skin is rotated around to the doctor blade 146 which scrapes the skin from the drum so that it falls into container C.

When the container C has been filled, it can be removed and replaced by an empty cup. That cup can, in turn, be filled with a different flavored yogurt, e.g. vanilla, by the operator depressing the appropriate key, say key 174b, of keypad 174.

As with the FIG. 1 apparatus 10, apparatus 80 may be arranged to dispense different size product portions. Preferably, also, controller 172 is programmed so that after each serving, valve 122 controlling the flow of gas to fitting 114 is opened while the drum 84 executes a complete revolution. The gas clears the fitting 114, conduit 138 and distributor 142 of product from the previous serving, while the doctor blade scrapes clean the entire surface 84a of drum 84 as it continues to rotate. This ensures that there is minimal flavor carryover from one product serving to the next and that the drum and fluid lines are clean.

Although in the apparatus 80 specifically illustrated herein, the flavor additives are injected into the product mix stream via the axial passage 117 of manifold 116, they could just as well be injected directly into the air stream. This simply involves interchanging the positions of pipes 118 and 126 so that air is supplied to passage 117, while product mix is supplied to the arm 114b of the T-fitting 114. That arrangement has an advantage in that when the system is flushed out at the end of each dispensing cycle, the air flowing through pipe 118 will purge the manifold passage 117, the inner ends of the injection ports 116a to 116c and the leg 114a of the T fitting. Obviously in both arrangements, the valves controlling the flow of product mix and additives should be as close as possible to the fitting 114 and manifold passage 117 to minimize the standing volumes of product mix and additives after purging.

It will be appreciated also that flavor carryover may be eliminated entirely by using, instead of the manifold 116, a separate T-fitting and turbulence conduit to dispense each of the three product flavors. Still further, in some instances, it may be desirable to premix the flavoring and yogurt mix to provide three separate flavored yogurt mixes to the three separate fittings and turbulence conduits. An arrangement such as this is shown in FIG. 7. Three preflavored yogurt mixes are supplied via separate valves 166a, 166b and 166c to three T or Y fittings 114a, 114b and 114c, respectively. These fittings have dedicated turbulence conduits 138a, 138b and 138c leading to separate distributors 142a, 142b and 142c positioned over drum 84 as shown. Thus with this embodiment, there can be no flavor carryover from one product serving to the next.

If desired, the apparatus 80 can be provided with the steam cleaning or sanitizing fluid feature described above in connection with apparatus 10 and may also include the described dispenser for depositing nuts or other toppings onto the product in container C.

Apparatus 80 has all of the other advantages described above for apparatus 10 in that it produces a product which freezes instantly with essentially no large unpalatable ice crystals. Resultantly, the product dispensed to the container C is composed of very small aerated yogurt particles freshly made to produce a product which is especially flavorful and palatable. As with apparatus 10, the aeration of the product is controlled primarily by the length of the turbulence conduit 138. The degree of freezing may be controlled by varying one or more factors such as the speed of the drum 84, the drum temperature or the thickness of the mix.

Figure 8:
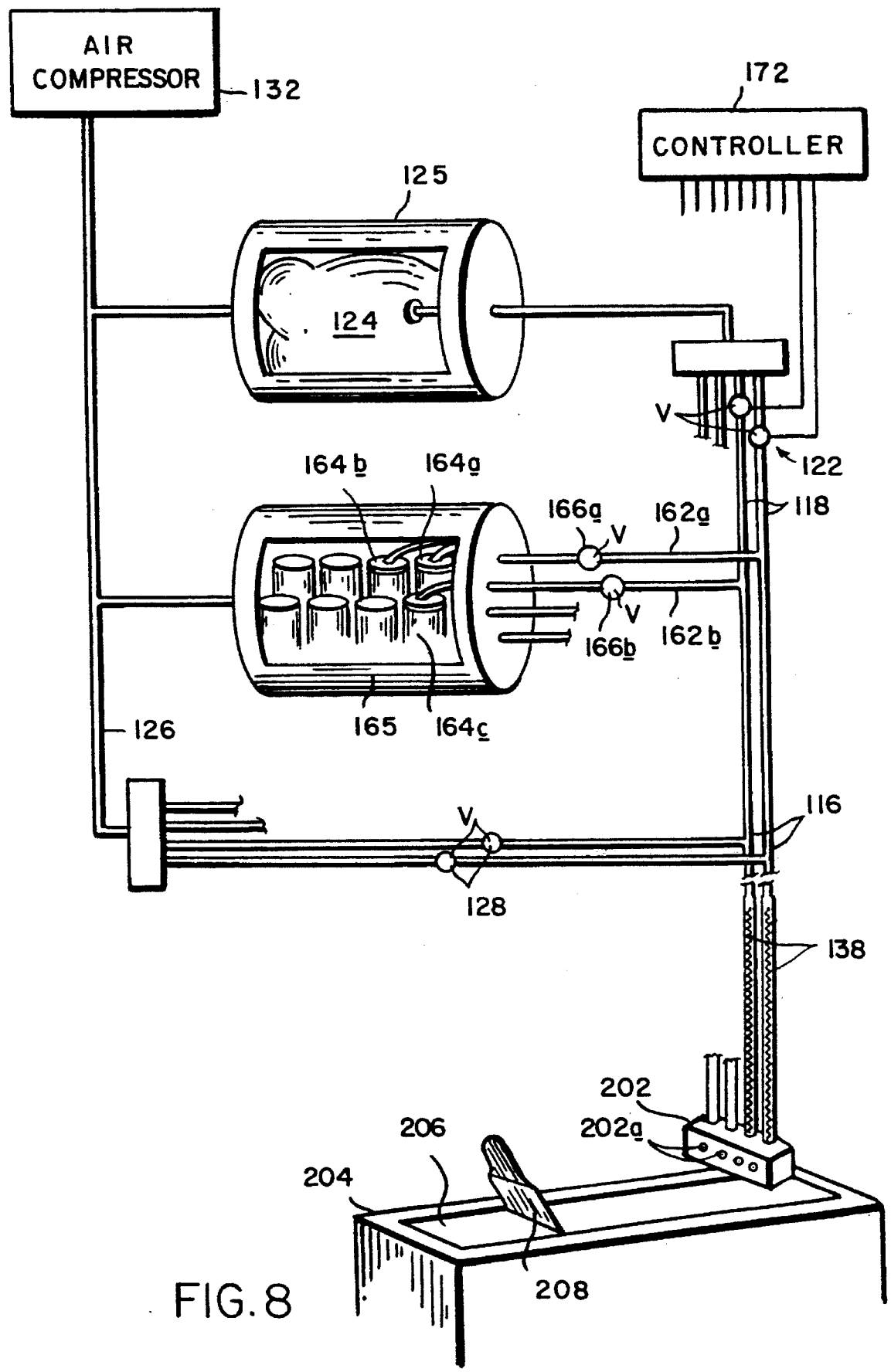
FIG. 8 is a diagrammatic view of another embodiment of the invention.

Refer now to FIG. 8 which shows apparatus for producing and dispensing frozen products using flat cooling means to freeze the products. The identifying numerals in the figure are the same as those used for the corresponding parts of the FIGS. 5 and 6 apparatus described above.

This system is basically the same as the one depicted in FIGS. 5 and 6 except that it delivers the product, e.g., yogurt, and the gas through a plurality of valved lines to a plurality of mixing means 116 and turbulence tubes 138. The tubes 138 terminate in a head 202 which includes control buttons 202a for releasing product from a selected one or more of the turbulence tubes 138.

Preferably, the pipes leading to tubes 138 are flexible so that an operator can move the head over a cabinet 204 containing a thermally conductive top plate 206. A refrigeration unit similar to unit 104 in FIG. 4 is situated in cabinet 204 for cooling plate 206 to a temperature below freezing.

To use the FIG. 8 apparatus, the operator may press one (or more) of the buttons 202a to discharge liquid yogurt having a particular flavor(s) onto plate 206. The yoghurt spreads out on the plate and freezes. The operator may then scrape the frozen product from the plate using a scraper 208 and deposit it in a suitable container. The procedure is similar to making pancakes on a griddle using a bar-type drink dispenser, except that the fluids being dispensed are different flavored liquid desserts which are frozen on the plate 206.

It will thus be seen that the objects set forth above, among those made apparent from the preceding description are efficiently attained. Also, certain changes may be made in carrying out the above method and in the construction set forth without departing from the scope of the invention. For example, instead of using a two-fluid mixing chamber to which gas is supplied under pressure, in some applications, it may be practical to use a single-fluid nozzle or fitting and to draw in the aerating gas, e.g. air, through a vent in the nozzle or the fitting or the turbulence conduit, as in a venturi.

Further, while the invention has been described with particular reference to the formation and dispensing of frozen foods such as yogurt and the like, it may also be utilized profitably in general to thoroughly mix one or more liquids with one or more fluids (gases or liquids). Thereafter, the temperature of the resultant product may be reduced to form a solid or semi-solid product in which one component is incorporated intimately in the other. Therefore, it is intended that all matter contained in the above description or shown in the accompanying drawings be interpreted as illustrative and not in a limiting sense.

It is also to be understood that the following claims are intended to cover all of the generic and specific features of the invention described herein.

What is claimed as new and desired to be secured by Letters Patent of the United States is:

1. Apparatus for producing and dispensing an aerated food product comprising mixing means for mixing a liquid and a gas to produce an atomized fluid stream comprised of liquid particles;

means defining a flow-through passage having an entrance end positioned to receive the fluid stream from the mixing means and an exit end spaced from the entrance end, said passage confining the flow of the fluid so that the liquid particles coalesce and become aerated before the fluid leaves the passage through said exit end thereof;

cooling means located adjacent to said passage defining means for at least partially freezing the aerated fluid exiting said passage to form said food product;

source means for providing a liquid to said mixing means in response to fluid pressure;

a source of pressurized gas, and means for conducting said gas to said mixing means and to said source means so that said gas propels said liquid to said mixing means, atomizes the liquid in the mixing means and forces said atomized fluid stream through said passage so that a uniformly aerated fluid exits said passage.

2. The apparatus defined in claim 1 and further including flavoring source means responsive to fluid pressure for introducing liquid flavoring into said fluid before said fluid stream exits said passage, and means for conducting said gas to the flavoring source means so that the flavoring is introduced into said fluid stream under pressure.

3. The apparatus defined in claim 2 wherein the flavoring is introduced into said liquid upstream from said passage.

4. The apparatus defined in claim 2 wherein the flavoring is introduced into the liquid from said source means.

5. The apparatus defined in claim 2 wherein the flavoring is introduced into the gas from the gas source.

6. The apparatus defined in claim 2 wherein the flavoring source means comprise pressure vessel means connected to said gas conducting means;

a plurality of collapsible containers containing different liquid flavorings positioned inside the pressure vessel means and communicating with said passage, and means for controlling the liquid flow from each container to said passage so that the flavorings from said containers can be introduced selectively into said fluid stream.

7. The apparatus defined in claim 6 wherein said controlling means include tubes leading from said containers to said passage, and remotely controllable valves connected to said tubes for controlling fluid flow through said tubes into said fluid stream.

8. The apparatus defined in claim 7 and further including another remotely controllable valve included in said conducting means between said gas source and said mixing means for controlling gas flow to said mixing means, and a further remotely controllable valve connected between said source means and said mixing means for controlling the flow of liquid to said mixing means.

9. The apparatus defined in claim 1 and further including one or more additional mixing means similar to said first-mentioned mixing means;

one or more additional passage defining means similar to said first-mentioned passage defining means for receiving the fluid stream from the corresponding one or more additional mixing means, said source means providing said liquid to all of said mixing means and said conducting means conducting gas to all of said mixing means so that a uniformly aerated fluid can exit each passage for freezing by the cooling means, and means for introducing a different fluid additive from a selection of additives into the fluid flowing through each passage.

10. The apparatus defined in claim 9 and further including means for separately controlling the fluid flow from each said passage to enable the dispensing of food product with a selected additive.

11. The apparatus defined in claim 10 wherein the introducing means comprise pressure vessel means connected to said gas conducting means, and a plurality of collapsible containers containing different additives positioned inside the pressure vessel means, each container communicating with a different passage.

12. The apparatus defined in claim 11 wherein said cooling means comprise a cold plate located adjacent to the exit ends of all of said passage defining means.

13. Apparatus for producing and dispensing an aerated food product comprising mixing means for mixing a liquid and a gas to produce an aerated fluid stream comprised of liquid particles;

means defining a flow-through passage having an entrance end positioned to receive the fluid stream from the mixing means and an exit end spaced from the entrance end, said passage confining the flow of the fluid so that the liquid particles coalesce and become aerated before the fluid leaves the passage through said exit end thereof;

cooling means located adjacent to said passage defining means for cooling the aerated fluid exiting said passage to form said food product;

source means for providing a liquid to said mixing means in response to fluid pressure;

a source of pressurized gas, and means for conducting said gas to said mixing means and to said source means so that said gas propels said liquid to said mixing means, aerates the liquid in said mixing means and forces the aerated fluid stream through said passage so that a uniformly aerated fluid exits said passage.

14. Apparatus for producing and dispensing an aerated food product comprising a mixing chamber having first and second inlets and an outlet;

a source of pressurized gas;

a small diameter conduit connected to the chamber outlet;

a pressurizable source of liquid product connected to the chamber first inlet;

means for supplying gas from said source to the second chamber inlet and to said pressurizable source so that the same gas propels the liquid product to the mixing chamber, aerates the liquid product in that chamber and forces the aerated liquid product through the conduit so that a uniformly aerated liquid product is delivered from the conduit, and means for cooling the liquid product delivered from the conduit.

15. The apparatus defined in claim 14 and further including means for connecting a pressurizable source of additive to the chamber first inlet, and means for connecting the gas source to the pressurizable source of additive so as to force that additive into the liquid product.

16. Apparatus for producing and dispensing an aerated food product comprising a mixing chamber having first and second inlets and an outlet;

a source of pressurized gas;

a small diameter conduit connected to the chamber outlet;

a pressurizable source of liquid product connected to the chamber first inlet;

means for supplying gas from said source to the second chamber inlet and to said pressurizable source so that the same gas propels the liquid product to the mixing chamber, atomizes the liquid product in that chamber and forces the atomized liquid product through the conduit so that a uniformly aerated liquid product is delivered from the conduit, and means for cooling the liquid product delivered from the conduit to at least partially freeze said product.

17. The apparatus defined in claim 16 and further including means for connecting a pressurizable source of additive to the chamber first inlet, and means for connecting the gas source to the pressurizable source of additive so as to force that additive into the liquid product.

* * * * *

UNITED STATES PATENT AND TRADEMARK OFFICE
CERTIFICATE OF CORRECTION

PATENT NO. : 5,603,257
DATED : February 18, 1997
INVENTOR(S) : Paul Kateman et al.

It is certified that error appears in the above-identified patent and that said Letters Patent is hereby corrected as shown below:

On title page, add the following:
[73] Assignee: Kateman Family Limited Partnership Signed and Sealed this Eighth Day of August, 2000

Attest:

Attesting Officer

Q. TODD DICKINSON

Director of Patents and Trademarks